Dec. 2, 1969   F. R. BRADLEY   3,482,126
ELECTROMAGNETIC INDICATOR
Filed June 24, 1966   2 Sheets-Sheet 1

INVENTOR
FRANK R. BRADLEY
BY Eugene L. Lovette
ATTORNEY

Dec. 2, 1969

F. R. BRADLEY 3,482,126

ELECTROMAGNETIC INDICATOR

Filed June 24, 1966

INVENTOR
FRANK R. BRADLEY
BY Eugene S. Loxette
ATTORNEY

United States Patent Office 3,482,126
Patented Dec. 2, 1969

3,482,126
ELECTROMAGNETIC INDICATOR
Frank R. Bradley, 9 Dash Place,
New York, N.Y. 10463
Filed June 24, 1966, Ser. No. 560,146
Int. Cl. H02k *37/00, 21/12, 1/24*
U.S. Cl. 310—49
4 Claims

ABSTRACT OF THE DISCLOSURE

An electromagnetic character indicating device having magnetic rotor and stator elements. The rotor and stator are made of remanent magnetic material. The remanent material of the stator can be set, for example, with one of ten distinct diametral fluxes depending on which input terminals are pulsed. The energizing signal can then be removed but the rotor still aligns itself with the diametral flux previously established. The device thus requires energizing signals in the order of milliseconds. Soft magnetic pole pieces are disposed along the desired flux diameters of the stator to steer the flux and prevent undesirable displacements. A shorted coil on the rotor, whose axis of symmetry is offset from the rotor axis, insures that the rotor turns 180° in the event such a change in position is required.

---

This invention relates to data display apparatus, and more particularly to electromagnetic character indicating devices.

There are numerous mechanisms for displaying data which are commercially available. On such type of indicator includes magnetic rotor and stator elements. Attached to the rotor is a display drum having the display data disposed around it. Dependent upon the position of the magnetic rotor element the drum rotates to a designated position and a respective numeral or letter appears in a window of a supporting housing.

Around the magnetic stator element may be wound a series of coils. The coils are energized in such a manner that a flux is set up in the stator and along one of its diameters. The magnetic rotor element, e.g., a permanent magnet, aligns itself with the diametral flux. In a typical one of these devices the stator might have its coils wound around it such that ten distinct diametral fluxes may be set up depending upon the excitation mode. In this case the rotor would have ten numerals or letters printed on its display drum and dependent upon the manner in which the stator coils are energized, i.e., dependent upon which of the ten stator diametral fluxes is set up, a respective one of the indicator numerals or letters will appear in the housing window.

Electromagnetic indicator devices of this type have been described in many prior art patents. Illustrative of these are patents: No. 1,058,545, issued to H. Caldwell on Apr. 8, 1913; No. 2,908,900, issued to B. M. Gordon et al. on Oct. 13, 1959; No. 3,009,140, issued to B. M. Gordon on Nov. 14, 1961; No. 3,118,138, issued to R. J. Milas et al. on Jan. 14, 1964; No. 3,183,503, issued to R. F. Casey on May 11, 1965; No. 3,201,785, issued to A. E. Knotowicz on Aug. 17, 1965; and No. 3,218,625, issued to A. E. Knotowicz on Nov. 16, 1965. One of the commercially available units of this type is that sold under the trademark Magneline by the Patwin Electronics Company.

There are two basic shortcomings in the prior art electromagnetic indicator device of the type described. The first of these relates to the time required to set the device in a particular state. In the Patwin commercial unit the input signal must be one-half to one second in duration. Since the indicator devices are for visual observation, the fact that up to a second is required to set a device is not necessarily a shortcoming because the ordinary observer cannot respond to a series of these devices in less time. The serious problem is that involved with the electronic circuitry which sets the devices. Hundreds and even thousands of these units may be used in a single installation with the same electronic circuitry controlling the setting of all units. If one thousand display devices are used at a single installation and one second is required to set each of them, on the average each of the devices can be updated only at intervals greater than sixteen minutes. This may be intolerable and for this reason many setting circuits may have to be used with the concomitant increased cost.

The second major shortcoming of the prior art type device is that it is difficult to insure that the rotor, once set in a preselected position, will remain there. If the applied electrical input signal to the stator coils is maintained, the diametral flux does not disappear. Then even if the unit is mechanically jarred and the rotor displaced it will return to the desired position. However, in a typical installation the electrical input signal is applied to the stator coils only for the one-half to one second required to set the device. To circumvent this problem it is possible to provide individual circuitry for each of the units which applies a continuous control current to the stator coils. However, the cost of this circuitry is high and it obviates one of the most desirable characteristics of this type of display, namely, no standby power requirement. Alternatively, it is possible to provide mechanisms such as those shown in Patent No. 2,943,313, issued to B. M. Gordon et al. on June 28, 1960, and Patent No. 3,240,965, issued to R. F. Casey on Mar. 15, 1966. The structures disclosed in these two patents show mechanisms for providing restraining torques which preclude drift of the rotor due to environmental disturbances such as vibration. But a careful review of these patents reveals that if a substantial displacement does indeed occur as a result of a severe acceleration, the rotor will not return to the initial position and instead will become locked in a new position with the wrong numeral being displayed.

It is an object of this invention to provide an electromagnetic indicating device which may be set with the application of microsecond or millisecond duration control signals.

It is another object of this invention to provide an electromagnetic indicating device in which the rotor, even if substantially displaced due to a severe shock, will return to the designated position without the use of a continuous electrical control signal.

In the prior art devices of the type described the rotor is a permanent magnet and the stator consists of "soft" magnetic material. When a particular stator coil or group of coils are energized the stator diametral flux assumes a distinct orientation. The permanent magnet rotor aligns itself with this flux.

Soft magnetic material is characterized in that the flux set up in it disappears when the magnetizing force ceases. A setting current (magnetizing force) is required to maintain the diametral flux while the rotor magnet and the display drum move to the correct position. If it takes one second for the rotor and the drum to rotate from one position to another the stator flux must be maintained for this time interval, and since the stator flux is maintained only while the setting current is applied the duration of this pulse must be one second. As described above it is inconvenient in many cases to provide setting pulses of this duration.

The stability problem (after the unit has been subjected to mechanical acceleration) also arises due to the fact that the stator diametral flux disappears when the control pulse terminates. In the absence of this flux the rotor, if displaced as a result of severe acceleration, may not return to its initial position.

Briefly, in accordance with the principles of my invention, my electromagnetic indicator device is similar to the prior art devices except that instead of using a soft magnetic material for the stator, a remanent or "hard" magnetic material is used, preferably of low coercivity. This material has the characteristic of maintaining a flux through it, once it is initially set up with the application of a current control pulse, even after the pulse terminates. Material of this type is used, for example, in the construction of magnetic cores for use in computer memories. The use of a remanent material for the stator obviates both of the above-described problems. Further, in every mechanization the rotor is a permanent magnet which does not induce sufficient flux in the stator magnet as to change the state of the stator magnet.

It may still take one second for the rotor to align itself with the diametral flux set up in the stator. However, this flux may be set in a matter of milliseconds or microseconds depending on the detailed setting circuitry. The electronic setting circuitry need apply only a pulse of duration necessary to magnetize the stator element in the appropriate manner. Thereafter, the electronic circuitry may operate upon another unit. Once the stator flux is set up, it is maintained until changed. Consequently, the rotor aligns itself as in the prior art devices even though the unit is no longer operated upon by the setting circuitry.

Because the stator flux is maintained even after the control pulse terminates, the rotor is held in position. Even if the unit is subjected to severe acceleration and the rotor is displaced far out of alignment, it will return to the initial position because the diametral flux is maintained in the stator. It should be noted that this diametral flux is maintained without standby power since the stator remanent material does not require a continuous current for its flux to be maintained.

It is a principal feature of this invention to use a remanent magnetic material for the stator element of an electromagnetic indicator.

As described above, both the Gordon et al. Patent 2,943,313 and the Casey Patent 3,240,965 provide mechanisms which are designed to lock the rotor in position once it is set. In the former an array of static magnetizable elements disposed around the rotor are used for this purpose, and in the latter a toothed ring of magnetically permeable material is used. Both of these mechanisms will fail in their functions if the rotor is displaced more than one-half the angular interval between character positions. However, both of these mechanisms serve the additional function of eliminating "dead spots." The basic electromagnetic indicator of the type described functions as a result of the torque produced on the rotor because of an initial misalignment between the rotor flux and the stator diameter flux. In the event that the rotor is to be rotated 180 degrees, the stator diameter flux changes direction but not position (orientation) with the application of a new setting pulse. The resultant force between the rotor and stator may in this case have its line of action pass directly through the center of rotation so that no rotational force results. In the prior art the provision of the additional mechanisms has eliminated these dead spot conditions.

The problem may arise however in embodiments of my invention because these additional mechanisms preferably are not used since their other function—to prevent rotor drift—is taken care of by the permanent stator flux.

It is possible to circumvent the dead spot problem in a variety of ways, all of which have as their function the introduction of a small perturbation in rotor position in the event the rotor is displaced exactly 180 degrees from the new command position. The torque required to produce this initial angular displacement, while dependent upon friction levels, may be quite small. One technique for accomplishing the objective is to provide a mechanism for moving the rotor slightly whenever a new input signal is applied to the unit. This mechanism would be independent of the particular signal applied and would merely insure that the rotor is initially in a position different from each of the possible stator diametral flux orientations.

Another technique is to control the initial displacement by the input signal itself. For example, the stator might be constructed such that the input signal controls diametral fluxes which are slightly off-set from those maintaied in the structure when the input signal is removed. In this case the initial diametral flux orientation would always be different from the orientation of the rotor magnet. Two embodiments of the invention are described below which are based on this second technique of utilizing the input signal directly to control the initial angular displacement of the rotor.

In one embodiment of the invention a series of capacitors is placed in parallel with various windings of the stator coils. These capacitors have the effect of introducing different time constant characteristics for the two half-currents which jointly induce the stator flux in the illustravtive embodiments of the invention. Since the two currents build up at different rates the stator diametral flux changes orientation slightly during the time that it changes direction. Once the currents build up to their final values the net effect is that the flux has changed direction only. But during the time when it is changing direction it changes its angular orientation slightly and for a short time is therefore displaced slightly with respect to the rotor. The small torque produced displaces the rotor slightly, the two fluxes are no longer aligned, and the rotor will move 180 degrees to its new position.

An alternative mechanism which generates a torque on the rotor is a short-circuited coil around the rotor. When the stator flux changes direction, current flows through the rotor coil and a torque is produced around the pivot axis even though the stator flux does not change orientation. The small torque is sufficient to displace the rotor slightly and it thereafter rotates the remainder of the 180 degrees to its new position.

It is another feature of this invention, in one embodiment thereof, to eliminate dead spots by providing circuitry for enabling the currents in the two halves of the stator winding which jointly induce the diametral flux to build up at different rates.

It is still another feature of this invention, in another embodiment thereof, to eliminate dead spots by providing a short-circuited coil wound around the rotor magnet.

Further objects, features and advantages of my invention will become apparent upon consideration of the following detailed description in conjunction with the drawing in which:

FIG. 3 is an axial exploded perspective view of a first embodiment of the invention and is similar to FIG. 3 of the Gordon et al. patent;

Figure 1:
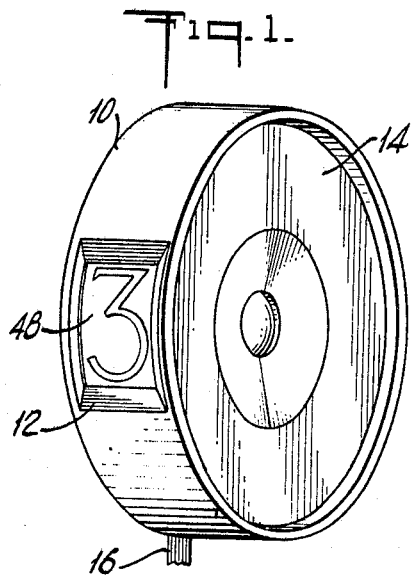
FIG. 1 is similar to FIG. 2 of Gordon et al. Patent 2,943,313 and is a perspective view of a data indicating device.

The basic unit, shown in FIG. 1 consists of a cylindrical housing 10 having a single rectangular window 12. Within the housing is a rotor 14 having an outer cylindrical surface 48. On surface 48 are the numerals 0–9, of which the numeral 3 is shown in window 12. Control signals are applied to wires 16, and dependent upon these signals the rotor rotates within the housing. For each input signal a respective one of the ten numerals appears in the window.

The indicating unit shown in FIG. 3 is very similar to that shown in FIG. 3 of the Gordon et al. patent, and for a more thorough description of certain of its features reference may be had to this prior art patent. The major difference between the structure of FIG. 3 and that of the Gordon et al. patent is that the stator is a high remanent magnetic material and the non-magnetic cylinder 71 and the iron bars 73 in the Gordon et al. structure are not included in the present configuration of FIG. 3.

Housing 10 is provided with a circular cover plate 30. The plate is secured by three screws 32 to the housing. Center screw 31 extends through the housing, stator 34, rotor magnet 46 and rotor 70 to the threaded axial opening 52 of arbor 50. Stator 34 is fixed in the housing. The stator includes two co-axial shells 42 and 44 which carry toroid 36.

While in the prior art devices the toroid is made of soft magnetic material, in FIG. 3 it consists of a remanent material. One such material is Remundur, whose nominal composition is 48% cobalt, 48% iron, 3½% vanadium and ½% manganese. The remanance of this material is in excess of 17,000 Gauss and it is characterized by a square hysteresis loop and a coercive force of one to sixty Oersteds. The toroid may be formed of stacked laminations. With the coils in place on the toroid and the output leads (not shown) brought out, the coil structure may be "potted" or encased in a plastic compound 40. Stator 34 may include three threaded openings into which screws 32 are fitted in order that the stator be fixed within housing 10.

Rotor 70 comprises a central hub 72 which diverges into a substantially circular side wall 74 which in turn supports the character bearing cylindrical surface 48. Permanent magnet 46 fits on hub 72. The magnet is fixed to the rotor. The character-bearing surface 48 thus moves with magnet 46.

Arbor 50 rotatably supports rotor 70 within housing 10. The arbor has a threaded axial opening 52 which on assembly is engaged by screw 31. Cylindrical surface 56 accepts ball bearing 58, which on assembly rotatably supports rotor 70 in the housing. Cover 60 is secured in place by snap ring 62.

When the entire structure is assembled magnet 46 is free for rotation within shell 42, i.e., the magnet rotates within the stator. Character-bearing surface 48 is disposed around stator shell 44. As the magnet moves within the stator, the different characters come to view in window 12 of housing 10. The character displayed depends upon the position of magnet 46, which in turn is dependent upon the magnetic field of toroid 36.

Figure 2:
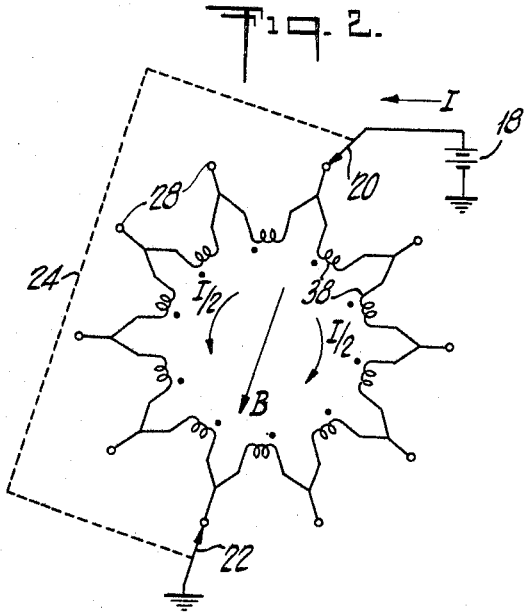
FIG. 2 is similar to FIG. 5 of the Gordon et al. patent and is a schematic circuit diagram illustrating the interconnection of the stator coils in the embodiment of FIG. 3, and the mode of actuation thereof.

The general operation of the structure of FIG. 3 (and those of the prior art) may be understood with reference to FIG. 2. The ten stator coils are serially connected by ten terminals 28. Dependent upon the character to be represented one of the terminals is grounded by switch 22 and the diametrically opposed terminal is connected by switch 20 to a signal source, shown only symbolically by battery 18. The two switches are mechanically ganged as diagrammatically indicated by broken line 24.

The effect of the circuit is to set up a current I which divides equally between opposite symmetrical semi-circles of coils 38. The net effect of both currents $I/2$ is to establish two semi-circular magnetic fields within the coils which oppose each other. The two fields join and flow along a diameter of the stator as shown by vector B.

Vector B is shown in one of the ten possible discrete positions which may be created by the application of current setting pulses to pairs of opposite terminals 28. Each field is separated from the adjacent fields by 36 degrees. If switches 20 and 22 are reversed the direction of vector B will be directly opposite to that shown in the drawing. The particular manner in which the coils are pulsed is not important for an understanding of the present invention, and for this reason the pulsing mechanism is shown only symbolically.

When a particular flux vector B is set up within the stator, magnet 46 aligns itself with it. The flux of the permanent magnet is from one pole to the other and the magnet rotates until its flux is aligned with that established along the stator diameter. It may require approximately one second for magnet 46 and rotor 70 to rotate to the point where the two fluxes are aligned. For this reason, in the prior art devices the setting current pulse is applied for this time duration.

In accordance with the principles of my invention, however, the stator magnetic element 36 consists of a remanent material. Consequently, once a particular flux B is established, it is maintained (at somewhat lower field strength) even after the setting current terminates. The flux may be set up with the application of a microsecond or millisecond pulse. While it may still require one-half to one second for the rotor magnet to align itself with the stator field, the setting pulse need not be applied for this time interval. The electronic circuitry for pulsing the unit may proceed to operate upon another unit.

As described above, in the prior art type device mechanisms are often provided for maintaining the rotor in a specific position even after the stator flux disappears with the cessation of the excitation current. Such mechanisms are not required in the device of FIG. 3. The stator flux persists until another excitation current is applied to the windings which establishes a new permanent magnet field. Consequently, no matter how far the rotor is jarred out of alignment it will return to its designated position.

Figure 4:
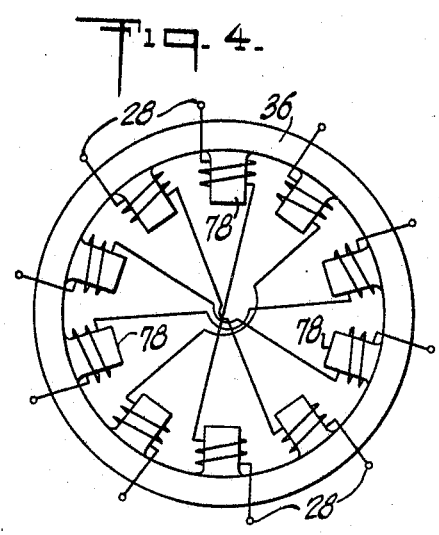
FIG. 4 is an alternative stator arrangement for use in the embodiment of FIG. 3.

An alternative design for the stator is shown in FIG. 4. Toroid 36 is once again comprised of remanent magnetic material. Attached to the toroid, however, are a series of radial poles 78 made of soft magnetic material. The coils are wound around these poles rather than the toroid itself. Instead of connecting all of the coils in series, the five opposite pairs of coils are connected individually in series. Switches 20 and 22 (FIG. 2) couple a selected pair of opposite terminals 28 to ground and battery 18. The current through any pair of coils establishes a flux along the respective diameter. The flux is returned around the two halves of the toroid. Once the flux is established it is maintained by the remanent material of the toroid and the device operates as described above.

The poles of soft magnetic material are used for initially establishing the flux and for defining the path of the flux vector B. Were the poles to comprise remanent material it would not be possible to demagnetize any two poles with the pulsing of a different pair since the new toroid flux would not flow through the previously magnetized pair of poles.

Other variations are possible, many of which are based on the prior art configurations. For example, poles 78 need not be radial and may instead be perpendicular to toroid 36. What is important however is that the stator element in any design include remanent magnetic material such that the diametral flux, once established, will persist until changed to a new orientation by the application of another control signal.

The problem of dead spots may be appreciated with reference to FIG. 2. Suppose a flux B is set up and the rotor magnet aligns itself with it. At some later time it may be necessary to cause the rotor to rotate 180 degrees. To accomplish this switches 20 and 22 are reversed and the two coil currents flow in the directions opposite to those shown in the drawing. The resulting flux B which is set up in the stator is also opposite in direction to that shown in the drawing. Initially the rotor is in the position previously determined by the operations of switches 20 and 22. If the new flux B is thought of as a magnet, its north pole is adjacent the north pole of the rotor magnet and its south pole is adjacent the south pole of the rotor magnet. Were the two flux vectors to be displaced slightly the rotor would pivot around its axis 180 degrees. However, if they are not displaced slightly no torque is developed around the pivot axis. The problem is the same in the prior art type devices where the new stator flux builds up from a zero value and in the configuration of FIG. 3 where the stator flux switches direction, that is, the magnitude in the initial direction decreases to zero and then builds up to the maximum value in the opposite direction.

Figure 5:
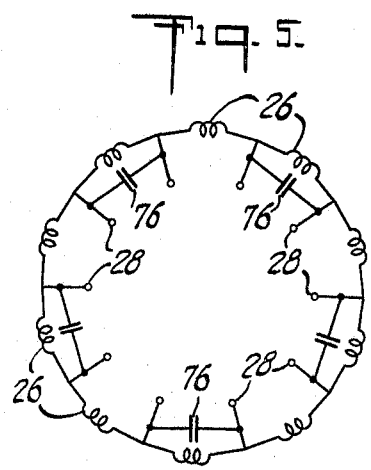
FIGS. 5 and 6 show two alternative mechanisms for use with the stator coils of FIGS. 3 and 4 for eliminating dead spots.

The problem man be overcome, as in FIG. 5, by providing five capacitors 76 connected in parallel with alternate coils on the stator 34 of FIG. 3. If any two opposite terminals 28 are connected to switches 20 and 22 it will be seen that one of the currents $I/2$ flows through five serially connected coils, three of which are in parallel with respective capacitors, and the other current $I/2$ flows through five coils, of which only two are connected in parallel with respective capacitors. Consequently, the two currents build up at different rates. This has the effect of building up a flux vector B which initially is not along one of the ten preselected diameters. Only after the two currents are both at their maximum values does the flux have the predetermined orientation. The overall flux build up has the effect of eliminating dead spots. Even if the flux vector B is to be reversed, i.e., rotated 180 degrees, during the course of its build up it is angularly displaced from the flux of the permanent magnet. A slight torque is developed which causes the rotor magnet to rotate slightly off the "dead center" position. Once the rotor magnet is displaced slightly in this manner the final stator flux B exerts a torque on the rotor which then rotates the remainder of the 180 degrees to its final position.

Figure 6:
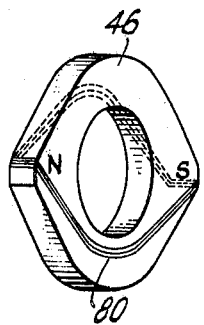

Another technique for eliminating the dead spot problem is shown in FIG. 6. This configuration can be used with either the stator of FIG. 3 or the stator of FIG. 4. A short-circuited coil 80 is wound around permanent magnet 46 as shown in FIG. 6. Even though the flux B changes direction without a change in orientation, a voltage is induced in the coil. The induced voltage causes a current to flow in the coil which in turn develops a momentary torque. This torque is sufficient to move the magnet from the dead center position. Once the flux axis of the permanent magnet is slightly displaced from the flux vector B the rotor continues to rotate to the new position 180 degrees away from the initial position.

Coil 80 is not wound arbitrarily on magnet 46. Referring to FIG. 6 it will be seen that the wire is along one half or less of the pole faces, rather than being carried by the entire face. The winding is symmetrical in that complementary ends of the two flat pole sections carry the wire. The reason for insuring that the wire is laid over only a section of each of the flat pole faces becomes apparent upon consideration of FIGS. 7A and 7B.

Figure 7A:
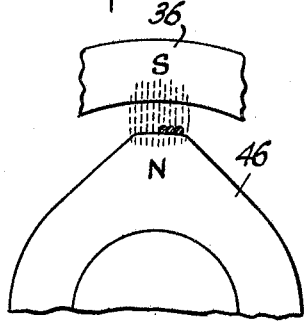
FIGS. 7A and 7B will be helpful in understanding a characteristic of the coil of FIG. 6.
Figure 7B:
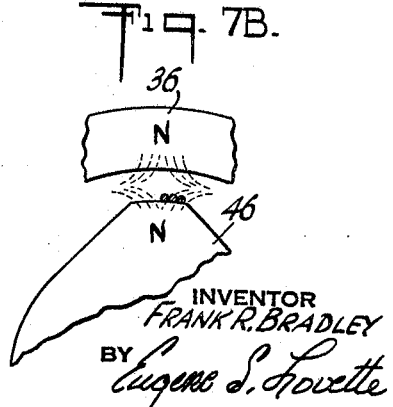
Figure 2:
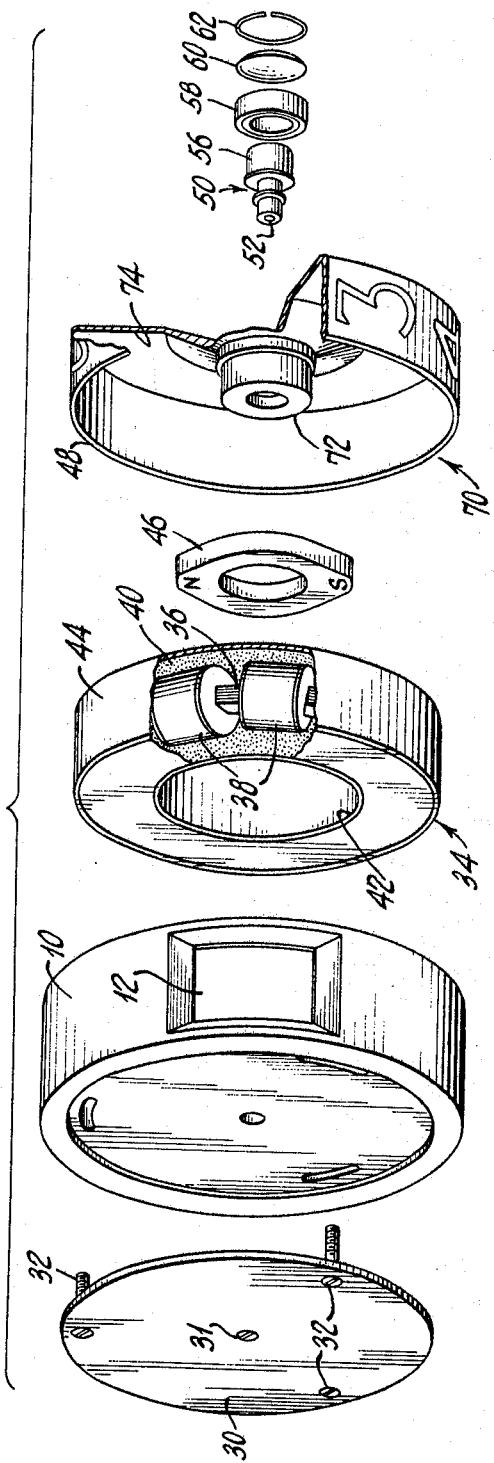

In these figures a cross-section of the rotor magnet and stator toroid is shown. The wire 80 is carried by only the rightmost section of the north pole face. In FIG. 7A the rotor is shown in a locked position, the stator having been pulsed to create a south pole toward which the north pole of the rotor rotated. (The south pole of the rotor magnet is adjacent the north pole of the stator.) The lines of flux are shown between the stator and rotor magnet poles.

When a diametrically opposite setting current is applied to the stator windings, the stator pole switches polarity. The lines of flux assume the position shown in FIG. 7B. In switching, the rightmost lines of flux pass through the winding inducing a voltage (and current) which applies a force to wire 80 in the horizontal direction. Were additional turns of the coil wound on the leftmost face of the magnet pole an equal force would be applied to these turns in the opposite horizontal direction. There would be no net force and the rotor would remain stationary. However, because only the rightmost lines of flux in FIG. 7B cut through turns of coil 80 there is a net force which tends to move the rotor. Similar remarks apply to the south pole of the rotor magnet.

It should be noted that the shorted coil serves in an additional capacity. If the unit is subjected to acceleration, while not energized, the coil acts as a dynamic brake on rotor motion. If the rotor moves the voltage and current induced in the coil create a torque which opposes the motion.

It should be noted that the capacitors of FIG. 5 and the coil of FIG. 6 are applicable to the prior art type devices utilizing a stator toroid of soft magnetic material.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. An electromagnetic positioning device comprising an annular ring of magnetic material, at least a portion of said annular ring being made of remanent magnetic material, a plurality of soft magnetic poles disposed around said ring, means for selectively establishing a flux in said ring and along any one of a group of predetermined diameters of said ring passing through an opposed pair of soft magnetic poles, and a rotor of magnetized material pivoted along the axis of said ring, said rotor having sufficient magnetic strength and said remanent material establishing a sufficient remanent flux to control the alignment of said rotor with the flux along said any one diameter of said ring.

2. An electromagnetic positioning device in accordance with claim 1 further including a short-circuited coil wound on said rotor along a diameter thereof different from the diameter of said rotor which is aligned with the flux along said any one diameter of said ring.

3. An electromagnetic positioning device in accordance with claim 1 wherein said flux establishing means includes a plurality of pairs of windings, each pair of windings being wound on a respective pair of said poles separated from each other on said ring at opposite ends of a respective diameter thereof.

4. In an electromagnetic indicator of the type having a stator, means for selectively establishing a plurality of discretely oriented magnetic fields along diameters of said stator, and a rotor having a magnet mounted to pivot within said stator whereby the magnet rotates into alignment with the magnetic field established along a diameter of the stator, the improvement comprising a coil wound on said rotor symmetrically disposed about a diameter of said rotor which is different from the diameter of said rotor which is aligned with the diameters of said stator along which said magnetic fields are established.

References Cited

UNITED STATES PATENTS

| | | |
|---|---|---|
| 2,908,900 | 10/1959 | Gordon et al. |
| 3,289,131 | 11/1966 | Watkins et al. \_\_\_\_ 340—271 XR |
| 2,943,313 | 6/1960 | Gordon et al. |
| 3,201,785 | 8/1965 | Knotowicz _____ 310—49 XR |
| 3,174,088 | 3/1965 | Muller _____ 318—138 |

(Other references on following page)

UNITED STATES PATENTS

| | | | |
|---|---|---|---|
| 3,041,516 | 6/1962 | Bailey | 310—49 XR |
| 3,183,503 | 5/1965 | Casey | 310—49 XR |
| 3,374,410 | 3/1968 | Cronquist et al. | 310—49 XR |
| 2,790,124 | 4/1957 | Eisele | 310—49 XR |
| 3,118,138 | 1/1964 | Milas. | |
| 3,056,053 | 9/1962 | Fink | 310—41 |
| 3,098,221 | 7/1963 | Propster | 340—378 XR |
| 3,375,384 | 3/1968 | Thees | 310—156 |
| 2,792,511 | 5/1957 | Horstmann | 310—216 |

OTHER REFERENCES

Kraus, "Electromagnetics," McGraw, Hill Book Co., 1953, Article 5-13, pp. 236-240.

Fitzgerald & Kingsley, "Electric Machinery," McGraw Hill Book Co., 2nd edition, 1961; Article 10-1, pp. 462-465; article H-2, pp. 502-506; Figure 3-18, p. 106.

MILTON O. HIRSHFIELD, Primary Examiner

B. A. REYNOLDS, Asistant Examiner

U.S. Cl. X.R.

310—156, 197, 269; 340—378